(12) United States Patent
Barritz et al.

(10) Patent No.: US 6,889,376 B1
(45) Date of Patent: May 3, 2005

(54) METHOD FOR MIGRATING FROM ONE COMPUTER TO ANOTHER

(75) Inventors: Robert Barritz, New York City, NY (US); Peter Kassan, New York City, NY (US)

(73) Assignee: Treetop Ventures, LLC, Syosset, NY (US)

( * ) Notice: Subject to any disclaimer, the term of this patent is extended or adjusted under 35 U.S.C. 154(b) by 0 days.

(21) Appl. No.: 09/566,326

(22) Filed: May 8, 2000

Related U.S. Application Data (60) Provisional application No. 60/133,728, filed on May 12, 1999.

(51) Int. Cl.[7] ............................ G06F 9/445; G06F 9/44
(52) U.S. Cl. ....................... 717/175; 717/177; 717/172; 717/169
(58) Field of Search ................................ 717/175, 177, 717/172, 169

(56) References Cited

U.S. PATENT DOCUMENTS

| | | | | |
|---|---|---|---|---|
| 5,142,680 A | * | 8/1992 | Ottman et al. ............... | 717/176 |
| 5,666,501 A | * | 9/1997 | Jones et al. .................. | 717/177 |
| 5,717,930 A | * | 2/1998 | Imai et al. ................... | 717/176 |
| 5,732,275 A | * | 3/1998 | Kullick et al. ............... | 717/173 |
| 5,745,766 A | * | 4/1998 | Bramnick et al. ........... | 717/177 |
| 5,765,152 A | * | 6/1998 | Erickson ........................ | 707/9 |
| 5,819,296 A | * | 10/1998 | Anderson et al. ........... | 707/204 |
| 5,832,274 A | * | 11/1998 | Cutler et al. ................. | 717/171 |
| 5,835,777 A | * | 11/1998 | Staelin ......................... | 717/175 |
| 5,860,012 A | * | 1/1999 | Luu ............................. | 717/175 |
| 5,875,247 A | | 2/1999 | Nakashima et al. | |
| 5,950,010 A | * | 9/1999 | Hesse et al. ................. | 717/178 |
| 6,016,400 A | * | 1/2000 | Day et al. .................... | 717/175 |
| 6,067,582 A | * | 5/2000 | Smith et al. ................. | 717/177 |
| 6,117,187 A | * | 9/2000 | Staelin ......................... | 717/169 |
| 6,192,518 B1 | * | 2/2001 | Neal ............................ | 717/178 |
| 6,282,711 B1 | * | 8/2001 | Halpern et al. ............. | 717/175 |
| 6,324,691 B1 | * | 11/2001 | Gazdik ......................... | 717/178 |
| 6,418,555 B2 | * | 7/2002 | Mohammed ................. | 717/175 |
| 6,681,323 B1 | * | 1/2004 | Fontanesi et al. ........... | 717/174 |

OTHER PUBLICATIONS

Desktop DNA from Miramar Systems (www.miramarsys-s.com)—Jun. 22, 1999.
AlohaBob's PC–Relocator (www.alohabob.com)—Aug. 1999.
PC Transplant Pro from Altiris (www.altiris.com)—Jan. 24, 2000.
International Search Report issued Feb. 1, 2001 in connection with the corresponding PCT application No. PCT/US00/12806.

* cited by examiner

Primary Examiner—Todd Ingberg
Assistant Examiner—Qamrun Nahar
(74) Attorney, Agent, or Firm—Ostrolenk, Faber, Gerb & Soffen, LLP (57) ABSTRACT

A process is provided for facilitating the migrating of a user's overall software environment from a first computer to a second computer. The process includes enhancing the operating system on the computer or adding additional functionality to the original and new computers such that software products are identified and their subsequent operation tracked. This tracking operation is used to identify user data files and other files, settings and data which might be potentially moved to the new computer. The method then causes the appropriate programs, settings and files to be packed and moved. The files and programs are unpacked, and the new computer is ready for use such that its appearance and operating environment are identical to that of the original computer.

51 Claims, 7 Drawing Sheets

METHOD FOR MIGRATING FROM ONE COMPUTER TO ANOTHER

RELATED APPLICATION

This Application claims priority and is entitled to the filing date of U.S. Provisional Application Ser. No. 60/133,728 filed May 12, 1999, and entitled "METHOD FOR MIGRATING FROM ONE COMPUTER TO ANOTHER."

BACKGROUND OF THE INVENTION

The present invention relates to a method for software and data transfer between computers, and more particularly to migrating software and data, including configuration data, from a present computer system to a second computer system.

As used herein, migration should be understood to encompass the process of replicating the functionality or capability in the second computer, and not the cloning, as such, of software and data. Thus, the process of transporting only a user's data files associated with a particular software product to a second computer that already has, or will have, a version of that software product installed is the same as also having transported the software product. Also, as used herein, references to a "current" computer means the first or original computer and references to "another" or "new" computer means a second computer to which a user wishes to migrate. The word "new" is not intended to mean only a computer which was previously unused by anyone, but rather that it is the terminus of the migration which begins with the "current" computer. Thus, a "new" computer can be previously used, and can even have been previously used by the individual utilizing the migration process.

Also, it should be understood that the term "software product" as used herein means an executable program, program libraries, installation files, configuration data, and ancillary programs including a suite of such items, shareware, freeware, & user written software.

A computer user might need to migrate from one computer to another for a variety of reasons such as (but not limited to):

(1) the user has purchased a new computer;
(2) the current computer is being repaired and the second one is a "loaner". In this case, there is a subsequent need to migrate back to the original;
(3) the user has need for a second computer at another location; or
(4) the user has a portable computer in addition to their original computer.

A computer user replacing his present system with another one faces an awkward and intractable problem: transferring important software and data from the current computer to the new one completely, without violating any software licenses and without unintentionally overwriting or corrupting newer versions of the same software. This problem typically arises in a graphical user interface environment such as a personal computer (PC) running a Microsoft WINDOWS operating system (such as Windows 3.1, Windows 95, Windows 98, Windows 2000, Windows NT, or any successor operating system), hereinafter referred to simply as "WINDOWS" or "Windows." References made herein to "operating system" include WINDOWS as well as other operating systems.

The important software and data requiring transfer falls into three broad categories as follows.

(1) Operational data settings that affect the operation of one or several programs. For example, parameters governing the operation of a modem, Internet access information such as telephone numbers, user IDs, passwords, etc., user-specific defaults for the operation of applications such as word processors and spreadsheets, national language and currency preferences, and the like.

(2) User data files or records that are typically explicitly created by a user and contain data of interest to the user. For example, electronic documents created by the user in a word processor, electronic mail system, etc., electronic spreadsheets, contact information created in a contact manager, personal financial information created in a financial management system, and Internet "bookmarks" (i.e., address information of World Wide Web sites saved by the user).

In practice, data in these first two categories are often stored in separate files. For example, a word processor typically stores some data affecting how a document is to be processed in a file a user would consider to be his own user data—the document file itself. Conversely, an electronic mail system may use a single file to store many types of data including operational data, the user's electronic mail messages and address book, etc.

(3) Programs such as directly executable software or installation files for software products. Not all of the software programs the user may want to use and is entitled to use on the new system may be preinstalled on that system. In some cases, a user may have the original distribution media such as the compact disc (CD), diskette, etc., for some software products on the current system and can therefore reinstall them on the new computer. In other cases, however, the software may have been downloaded from an Internet Web site, received via electronic mail or transferred directly from another computer. In still other cases, bug fixes and upgrades may have been applied to the executable files on the user's system after the product was installed such that the user's distribution media no longer contains the current version of the product. In all of these cases it is necessary for the user to ultimately decide how each software product and data is to be migrated to the new computer.

There is no convenient and reliable way available to users to transfer all such information in an orderly fashion when moving from the present computer to a new one. There are several reasons for this problem, described as follows.

(1) The user cannot simply copy and move, i.e. clone, all the files from the present computer. There are a variety of reasons contributing to this, including:

(a) the files include software products already installed on the new system. The files on the new system represent a more recent version or a successor product which cannot be replaced. For example, the new system might have the latest version of WINDOWS installed and therefore, copying some or all of the WINDOWS-related files from the present computer would corrupt WINDOWS on the new computer;
(b) the files include data pertaining to hardware on the current system but not on the new one;
(c) the directory structure on the new system may not be the same as on the current one; or
(d) the user may not have licensing rights to move the software to a new system.

(2) The user may not know which files to move. Software products store information in a variety of files and in a variety of formats without informing the user that they are doing so, where the files are stored, etc.

(3) The relevant information is sometimes stored in files which are normally hidden from the user and whose structure and contents are undocumented. The WINDOWS registry is such an example.

(4) The relevant information (data to be migrated) is sometimes stored in files which also include information the user would not want moved to the new system. This might be the case where the files contain information about a version of a product not installed on the new system.

(5) Users can create their own files and records with a great deal of freedom as to name and location such that a user might lose track of where they are stored and that they need to be moved.

(6) Users can receive such relevant files from a variety of sources, and might not remember that they need to be migrated to the new machine.

(7) Users can move and rename files freely.

(8) In many cases, software products themselves cannot simply be copied and moved as physical files. Some software products must be installed via an operating system interface so that the products are properly known to the operating system. This is particularly the case for programs which operate with WINDOWS.

(9) The computer can be shared by several users, each of whom has different settings, use different software products, and has different data associated with each of the products.

There are some products that may be regarded as related in some way to the present invention. A few products that may be regarded as related are discussed briefly below.

DRIVECOPY (POWERQUEST): According to vendor's product literature, "DRIVECOPY(tm) 2.0 by POWERQUEST is an easy to use utility for copying an old drive to a new drive. With a few simple steps the old hard drive is automatically copied to the new one without losing a single preference, setting or byte of data."

The problem with this type of product is that cloning a hard drive is most suitable for situations where a complete move to a new or temporary computer is necessary. This product produces an exact clone, including all software, settings, etc, whether needed or not. It does not provide for the installation of software products, license transfers, changes in program settings, i.e., the WINDOWS registry, segregation by user, and synchronization of data files (if a reverse move is required).

NORTON GHOST (SYMANTEC): NORTON GHOST provides disk cloning. It "works by creating an exact image of a PC's hard drive, effectively taking a "snapshot" of all the files—hidden, visible, and active—that make up the operating system, applications, and configuration settings. The image can then be copied to any number of PCs, thereby creating completely identical installations."

Here too, this product is most effective in cloning a new system and not for migrating software and data in an orderly manner. NORTON GHOST has the same disadvantages as those described with respect to POWERQUEST'S DRIVECOPY.

LAPLINK PRODUCTS (TRAVELING SOFTWARE): TRAVELING SOFTWARE markets a number of related products for file transfer and remote access. For example, "LapLink Professional frees you to maximize productivity wherever you are, by providing complete access to your office PC." LAPLINK PROFESSIONAL is "remote control and file transfer software."

This product is intended to provide file transfer capabilities to a user. However, the user is ultimately responsible for determining which files should be transferred, synchronization with out-of-date data files, etc. The product does not transfer any settings or personalization not kept in files, such as information in the WINDOWS registry. The transfer and successful reinstallation of software products is problematic for all of the reasons previously mentioned. Licensing is also not addressed by this product.

JAVA SERIALIZATION: "To serialize an object means to convert its state into a byte stream in such a way that the byte stream can be reverted back into a copy of the object. A Java object is serializable if its class or any of its superclasses implements either the java.io.Serializable interface or its subinterface java.io.Externalizable. Deserialization is the process of converting the serialized form of an object back into a copy of the object."

Serialization is a good method for enabling file transfer and archival of objects of different content and format. This too does not take into account the previously mentioned special considerations which are necessary to migrate software products.

UNINSTALLERS: Some uninstallers such as UNINSTALLER DELUXE by MCAFEE provide some capability to "uninstall" a product from one computer and then reinstall the product on another computer. To do so, such an uninstaller relies on information placed by software products in the WINDOWS registry. Such functionality is very much an afterthought for such products, and is very limited. Because the information placed in the WINDOWS registry is not architected for the purpose of uninstalling and reinstalling, this information is not complete or reliable. If the user has moved his settings data out of the subdirectory (folder) that contains the executable program files themselves, the uninstaller will likely be unable to find and move such data. Also, these types of uninstallers are not designed to handle all of the products, or a user-specified set of products, installed on a computer at one time. Rather, these products are only capable of handling uninstallation on a product-by-product basis. In addition, current uninstallers are not designed to handle the user's data files associated with the product being uninstalled.

Other uninstallers, such as NORTON CLEANSWEEP DELUXE by SYMANTEC and REMOVE-IT 98 by QUARTERDECK, are designed to provide clean-up and system tuning functions by removing unnecessary files and programs and correcting erroneous system configuration data. These types of uninstallers rely heavily upon the WINDOWS registry and the conventions established for installing and using WINDOWS software. Therefore, the handling of questionable files results in the user being required to make the final decision to proceed.

UPDATERS: Software products such as OIL CHANGE by MCAFEE are intended to use the Internet to determine whether updates are available for various installed software products. "Oil Change finds these updates from all over the Internet and installs them for you automatically." To do so, such a product relies on information placed by software products in the WINDOWS registry and conventions established for using such software. Such functionality is very much an afterthought for such products, and is very limited. Because the information placed in the WINDOWS registry is not architected for the purpose of version control, this information is not complete or reliable. Some software products create their own private registries, in which case the updater will likely be unable to find and update such data if the user has moved his settings data out of the subdirectory (folder) that contains the executable program files themselves.

Thus, there are numerous reasons why migrating from a current computer system to another one is problematic. It is desirable to have a system and process to ease migration from one computer to another.

SUMMARY OF THE INVENTION

It is an object of the present invention to provide a method and system for migrating software and data from an original computer to a second computer such that a user's operating environment as established on the original computer is preserved and available on the second computer. The method operates so as to minimize the knowledge and expertise required of the user by integrating the migration steps into the operating system and software products, and/or by only requiring the user to make simple choices regarding which programs and files to migrate.

The migration process steps include identifying the software product and data files eligible for migration during the installation of the software product on the current computer, tracking data files created or operated on by the software product on the current computer, packing the software and data files to be moved and moving them to the second computer, and unpacking the moved files on the second computer. Packing the files can include compressing or encrypting the files and copying them to a movable storage medium, or can include transferring the files to the second computer via a data communications network such as the Internet.

It is another object of this invention to provide a method for migrating software products according to their licensing terms and conditions. Migration can be effected by licensing terms and conditions such that software is moved only when permitted by the terms of its license, software is removed or disabled on the current computer according to its license terms, a software product is upgraded according to its license terms, and applicable updates (corrections) are provided to the software product in accordance with its licensing terms.

Some of these features, including license analysis and software updates, typically involves using a network to access a repository such as a vendor website, license clearinghouse, etc., to achieve their functionality.

Other features and advantages of the present invention will become apparent from the following description of the invention which refers to the accompanying drawings.

For the purpose of illustrating the invention, there is shown in the drawings a form which is presently preferred, it being understood, however, that the invention is not limited to the precise arrangement and instrumentality shown.

DETAILED DESCRIPTION OF THE INVENTION

The present invention is designed to make it easy to migrate a single, several or enough software products so as to replicate its or their existing software operational environment (at an existing computer), to a second, different computer.

Although the present invention is preferably applied to a personal computer, and more preferably personal computers running WINDOWS, it is equally applicable to higher capacity computers such as computers running a version of the UNIX operating system and mainframe computers.

The invention includes the following programs and other elements. (Some of these elements are optional, and some may be provided as a part of other computer programs, such as the operating systems in some cases, and in other cases, by the software product to be migrated. Also, the separation of the invention into these separately named elements is for convenience and clarity only; the invention may be implemented with several such elements combined into a single element, or any one element may be implemented as several separate elements.)

The KNOWLEDGE BASE is a collection of data, possibly stored in a database or table, providing information about software products, associated executable files, control files, data types, etc.

The DIRECTORY is a collection of data, possibly stored in a database or table, that contains information about the software products installed on a particular system, such as where the executable files, control files, and associated user files are located.

For the purposes of the present invention, the list of software products considered to be installed on a computer includes the operating system itself, even if the user receives the computer with the operating system preinstalled, and even if the operating system is installed in a non-standard way. The determination of what operating system is installed could be done in a number of ways. Preferably, it is written to the MOVING VAN, a component of the present invention, as part of the migration.

In a preferred embodiment, the DIRECTORY is implemented as an integral part of the operating system's own product directory (the OSPD), such as (on WINDOWS) the Registry. The DIRECTORY can also be implemented as an extension to the OSPD, a table linked to the OSPD, or an entirely separate file, database, etc.

The PACKER is a program (typically supplied by the software product to be moved) that passes to the LOADER a list of the executable files and control information, and optionally supplies versions of the files in a special format, for example, compressed and renamed, for use by the UNPACKER or other installation facility; written to conform to specifications provided by the present invention for such a program, or based on a model for such a program supplied as part of the present invention.

The UNPACKER is an optional program (typically supplied by the software product to be moved) that unpacks the executable files and control information; written to conform to specifications provided by the present invention for such a program, or based on a model for such a program supplied as part of the present invention.

The PACKER and UNPACKER for each software product can be identified in any of a variety of ways, such as establishing a naming convention for the executable files themselves. For example, the PACKER is always named "packer.exe" and the UNPACKER is always named "unpacker.exe". Other methods and conventions will be apparent to those skilled in the art.

In an alternative embodiment, the PACKER and the UNPACKER are both facilities of the operating system. In this case, what is identified in the DIRECTORY is the file or files containing the specifications of what is to be packed (and later unpacked), with appropriate parameters, rather the program doing the packing.

In the embodiment as described, the LOADER and UNLOADER optionally handle user data files. In an alternative embodiment, the PACKER and the UNPACKER also handle user data files. In this case, the functionality described as part of the LOADER and the UNLOADER are assumed by the PACKER and UNPACKER. In a variation of this embodiment, the PACKER and UNPACKER can handle some user data files (for example, those known to the software product), and the LOADER and UNLOADER other user data files (for example, by surveying the original computer to find files of the appropriate types not already packed by the PACKER).

The LOADER—a program, preferably a facility of the operating system, that manages the process of invoking the PACKER for each program to be moved, and writes the files specified by the PACKER into the Moving Van. The LOADER also performs various other functions, as described in more detail below. The LOADER is invoked via a command, a menu option, a separate program, a screen icon, or the like.

The Installation/Uninstallation Tracker (TRACKER) is a program, preferably a facility of the operating system, that monitors the installation and uninstallation of software products to capture relevant information.

The Execution Monitor (MONITOR) is a program, preferably a facility of the operating system, that watches the execution of software products to capture relevant information such as the creation, deletion, and moving of software product data files and user files created using the program. If the system supports multiple users or groups of users, the Execution Monitor keeps track of this information by user or user group.

The REGISTRY READER is a program that reads the Registry (or equivalent facility in operating systems other than WINDOWS) to determine what software products are installed. For computers upon which a license manager is installed, the REGISTRY READER also obtains relevant information from the license manager such as what software products are installed and what the applicable license rights are (and, possibly, other information, such as where the products are installed).

The SURVEYOR is a program that surveys the storage media of the computer to locate and identify executable files associated with software products.

The UNLOADER is a program, preferably a facility of the operating system, that executes on the new computer to read the contents of the MOVING VAN, optionally invoking the UNPACKER of each product, and installs the software products. The UNLOADER also performs various other functions, as described in more detail below. The UNLOADER is invoked via a command, a menu option, a separate program, a screen icon, or the like.

The DELETER is a program, preferably a facility of the operating system, that executes on the current (original) computer, with or without user interaction and confirmation, to uninstall the programs that were packed and delete those files that were packed, as appropriate. As explained further below, the DELETER can run as part of the packing and loading process, as part of the unloading and unpacking process (if the original computer is accessible while the UNLOADER is processing) or as a separate process some time after the unloading process has occurred.

The MOVING VAN is a collection of data pertaining to the software products to be moved (possibly including the executable files, control files, user data files, licenses, etc.) in a format suitable for use by the UNLOADER. The MOVING VAN can be written on transportable media such as diskette, CD, tape or tape cartridge; can be written on a storage device accessible via by both the current computer and the new computer via a network such as the Internet; can be written as a data stream sent via a network such as the Internet to the new computer; can be written as a temporary file and sent as a message, attachment, or FTP to the new computer. Transportable media or means of transport includes magnetic tape, diskette, CD, or other removable data storage device. Transportable media or means of transport also includes a file or a collection of files stored or sent electronically, including via the Internet, electronic mail, or cable, whether sent directly to the new computer or sent via an intermediary such as a network server, Internet web address, etc. The MOVING VAN can consist of a database, a collection of files, a collection of files within one or more directories or a single file. Also, the MOVING VAN can optionally incorporate data compression and/or encoding or encryption. The MOVING VAN includes a PACKING LIST, which consists of a record of each software product in the MOVING VAN, along with whatever flags and annotations may be necessary or convenient to facilitate the migration. The PACKING LIST can be a directory, a single file, a portion of another file, or a portion of a database. The name of the MOVING VAN can be predefined and known to the UNLOADER, or the user can identify the Moving Van to the UNLOADER through any of a variety of techniques, such as selecting a file name from a selection list.

Figure 1:
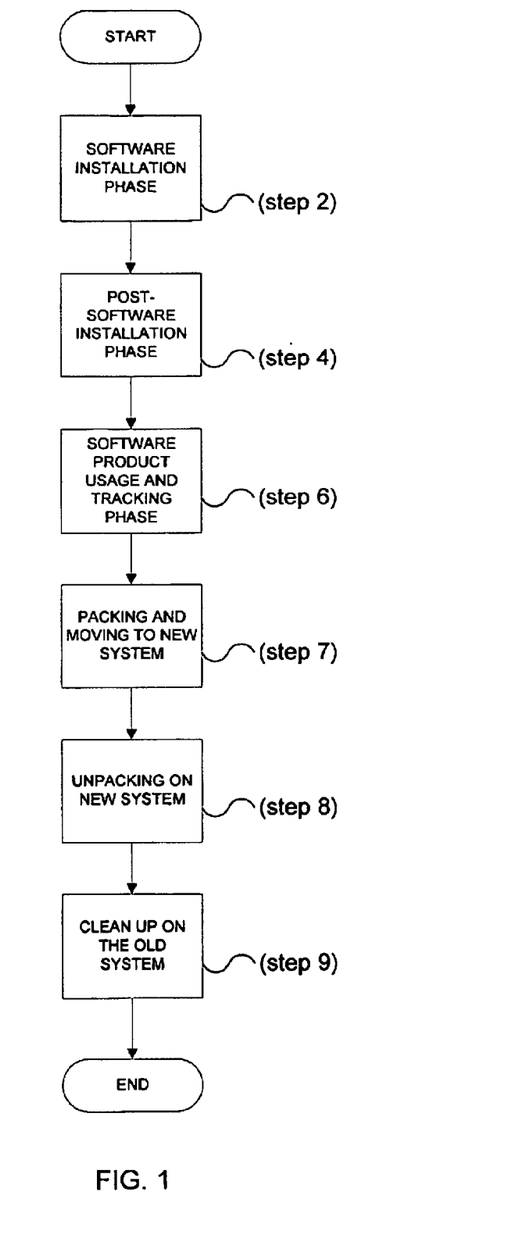
FIG. 1 is a flow chart of the overall method of the present invention.

Migrating involves activities that must occur during several phases. As shown in FIG. 1, the phases of operation of the present invention include:

(A) determining the software products installed and their PACKERs and UNPACKERs during installation and removal (step 2);

(B) determining the software products installed and their PACKERs and UNPACKERs after installation and removal (step 4);

(C) tracking the execution of software products on the current computer (step 6);

(D) packing and moving to the new computer system (step 7);

(E) unloading and unpacking (step 8); and (F) cleaning up on the original computer (step 9).

Each phase will now be described in detail.

(A) Determining the Software Products Installed and their PACKERs 28 and UNPACKERs 30 (FIG. 3) During Installation and Uninstallation In most modern computers, a software product is typically installed by executing a program (for example, in WINDOWS such a program is typically named "SETUP.EXE") created by the software developer using a special facility for this purpose. (Two such facilities, for example, are Wise for Windows Installer from Wise Solutions and InstallShield from InstallShield Software Corporation.) Such a program typically interacts with one or more defined facilities in the operating system.

Figure 2:
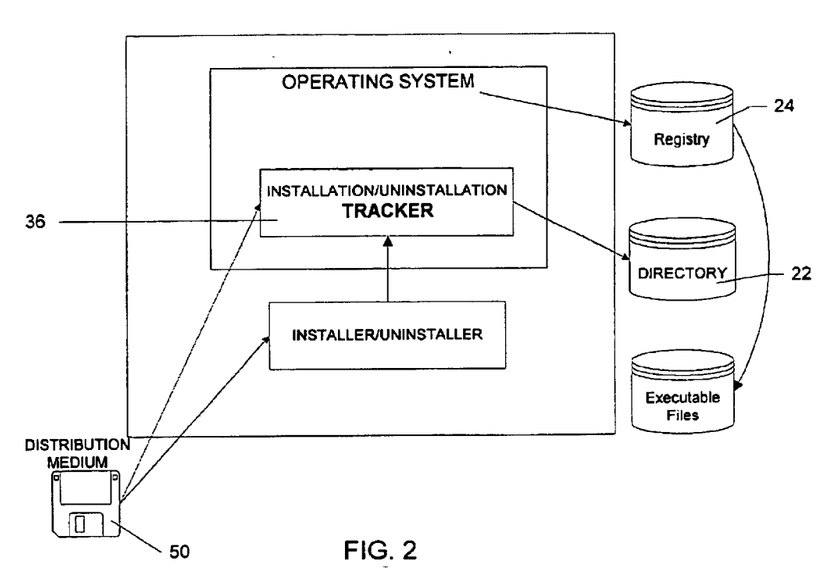
FIG. 2 is a diagram of the tracking of software products that have been installed or removed.
Figure 2A:
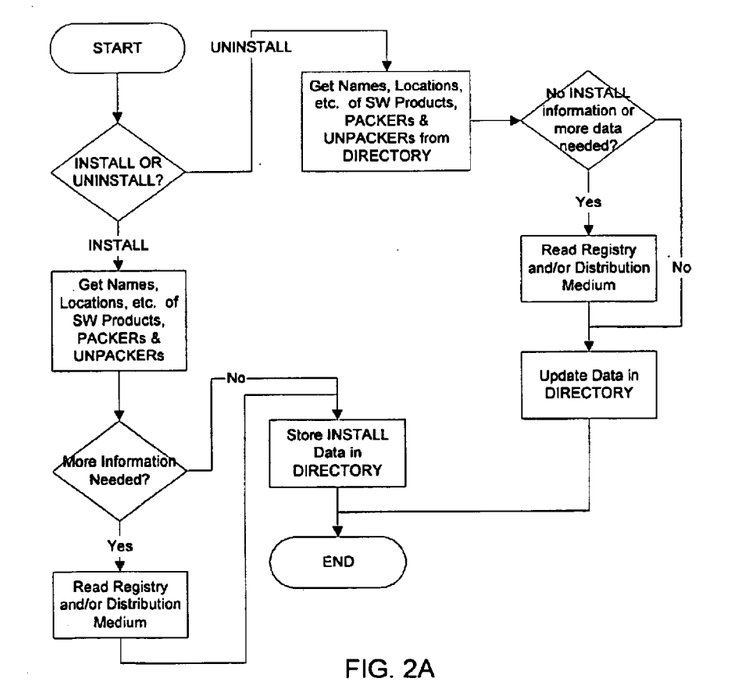
FIG. 2A is a flowchart of the tracking process for software products that have been installed or removed.

Depending on whether the present invention is implemented wholly or partly as a facility of the operating system, there are several ways in which this phase is accomplished. In the preferred embodiment (FIG. 2), the Installation/Uninstallation TRACKER is a facility of the operating system. When a user executes the program to install a software product from a distribution medium 50, via the Internet, etc., the TRACKER 36 obtains all relevant information (such as the name of the software product, the associated executable files, their locations as installed, the PACKER 28 and UNPACKER 30 and their locations as installed, etc.) and writes that information in the DIRECTORY 22 (FIG. 2). The TRACKER 36 may obtain the information it needs by reading it from the distribution medium 50, reading it directly from the registry 24, obtaining it from another facility of the operating system via the appropriate call, by monitoring the activities of the facilities of the operating system actually performing the installation, etc.

The activity of uninstallation must also be tracked so that the DIRECTORY 22 is an accurate reflection of what products are actually installed on the computer.

If the TRACKER 36 is not implemented as a facility of the operating system, a number of alternative, less preferable, implementations are possible. For example, the TRACKER 36 could be implemented as a resident program that monitors the activities of the operating system; could be implemented as a modification or add-on to the operating system; or in other ways involving interaction with installers and uninstallers.

(B) Determining the Software Products Installed and their PACKERs and UNPACKERs After Installation and Uninstallation If the TRACKER is not implemented as a facility of the operating system, a resident program, a modification or add-on to the operating system, or other ways involving interaction with installers and uninstallers, the determination of what software products are installed and their PACKERs and UNPACKERs can be made after-the-fact, at any time, in several ways, including:

The invention could provide a REGISTRY READER 40 (FIGS. 3 and 3A), which reads the Registry 24 (either via a defined interface provided by the operating system or via lower-level techniques known to those skilled in the art) to obtain the necessary information and writes it the DIRECTORY 22.

Figure 3:
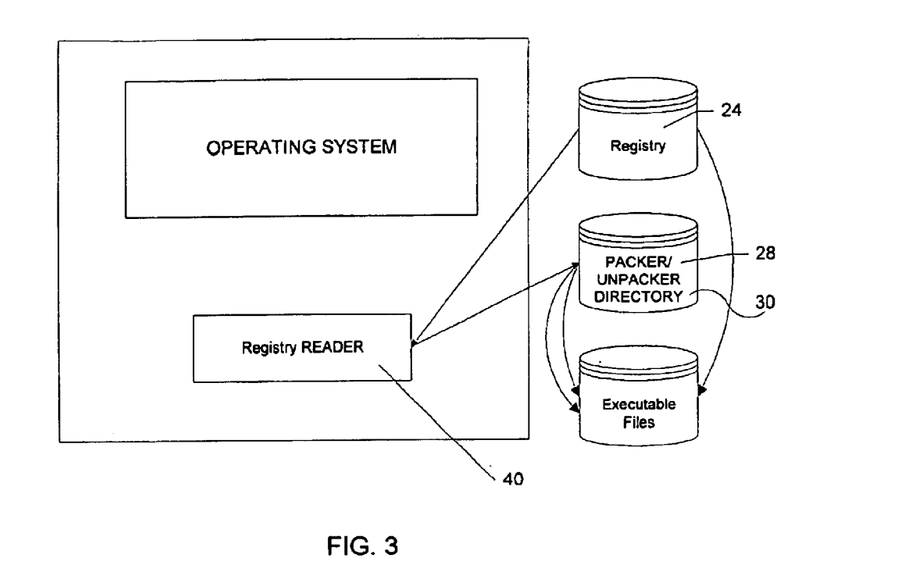
FIG. 3 is a diagram of determining the software products that are installed after these products have been installed or removed.
Figure 3A:
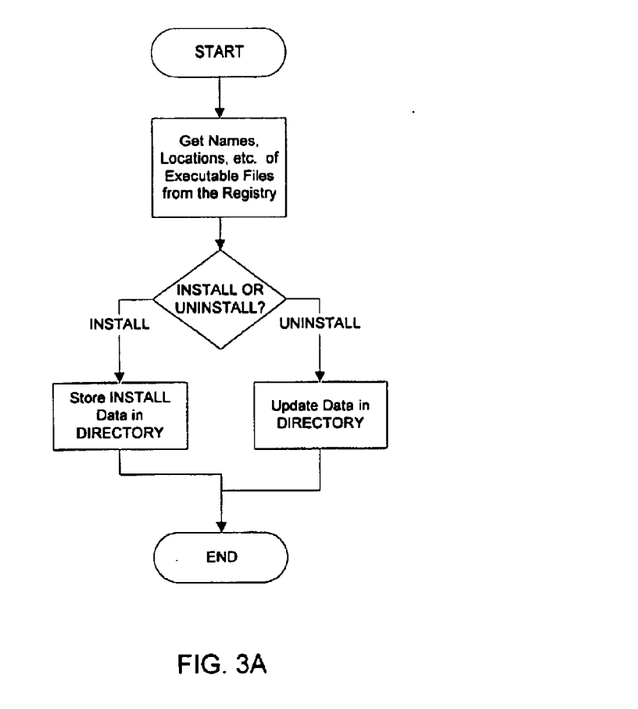
FIG. 3A is a flowchart for determining from the Registry which software products are currently installed.

If a license manager is operating on the computer, the REGISTRY READER 40 obtains information as to what software products are installed from the license manager or the license manager log.

Figure 4:
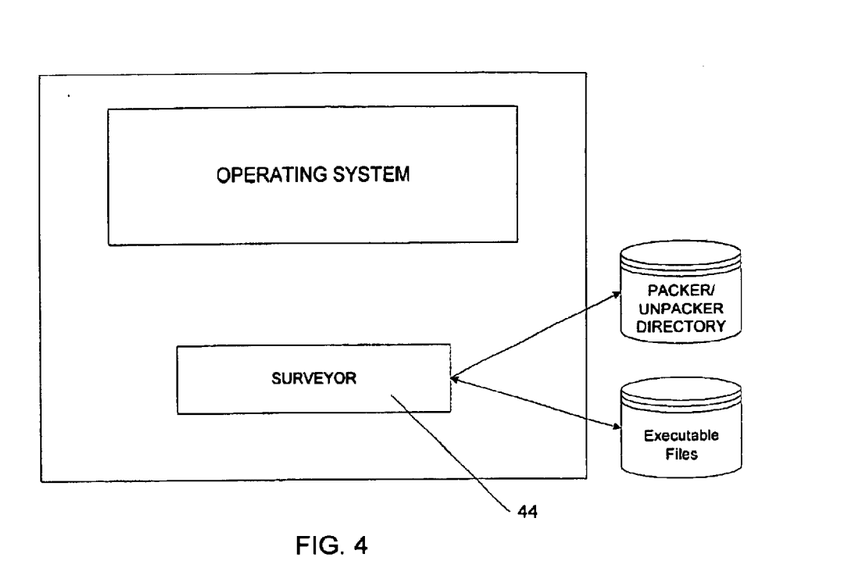
FIG. 4 is a diagram of determining the software products that are installed after these products have been installed.

The invention can provide a SURVEYOR 44 (FIG. 4) that scans all the files on the computer to find the executable files, and using a KNOWLEDGE BASE (not shown, possibly as a separate program running as a separate step) identify what software products, if any, each executable file is associated with, as well as finding and identifying the PACKERs 28 and UNPACKERs 30 for each software product.

(C) Tracking the Execution of Software Products on the Current Computer.

Typically, when a software product creates, modifies, reads, displays, or deletes a file, it passes information about the file to the operating system. This information includes file name, directory (folder), size, date of access, nature of access such as creation, modification, read, display, delete, and the like.

In the preferred embodiment (FIG. 5), the MONITOR 38 is a facility of the operating system. The MONITOR 38 monitors the files created, moved, or deleted by the software product, and keeps information pertaining to such files in the DIRECTORY 22. If multiple software products access the same file, the MONITOR 38 is capable of keeping track of this fact.

Figure 5:
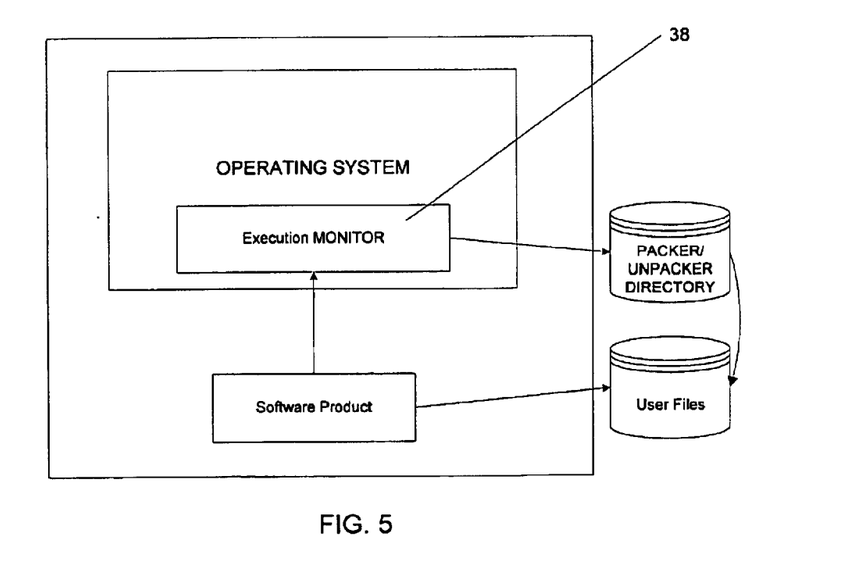
FIG. 5 is a diagram of determining user files by monitoring the execution of software products.

In less desirable embodiments, the MONITOR 38 is implemented as a resident program, as a modification or add-on to the operating system, and in other less desirable ways.

(D) Packing and Loading

Figure 6:
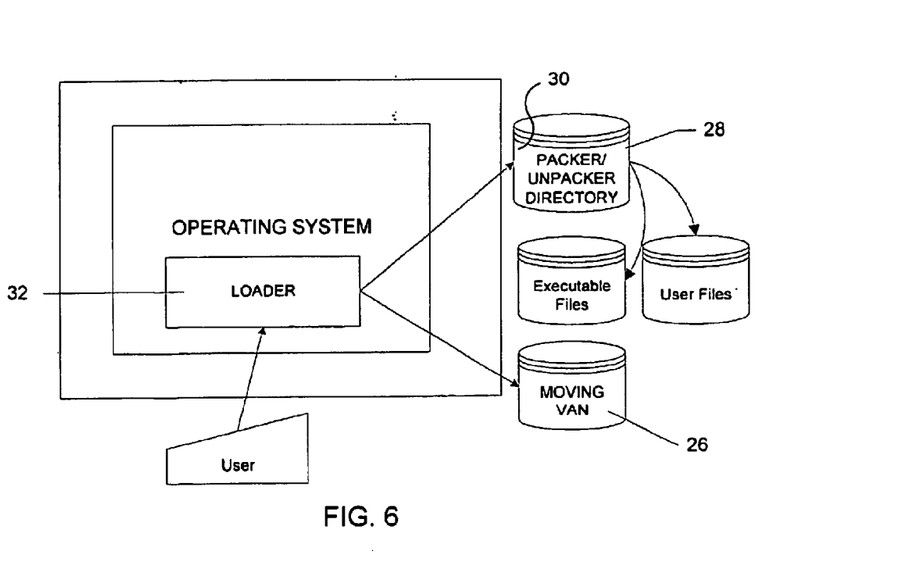
FIG. 6 is a diagram of the packing and loading process.
Figure 6A:
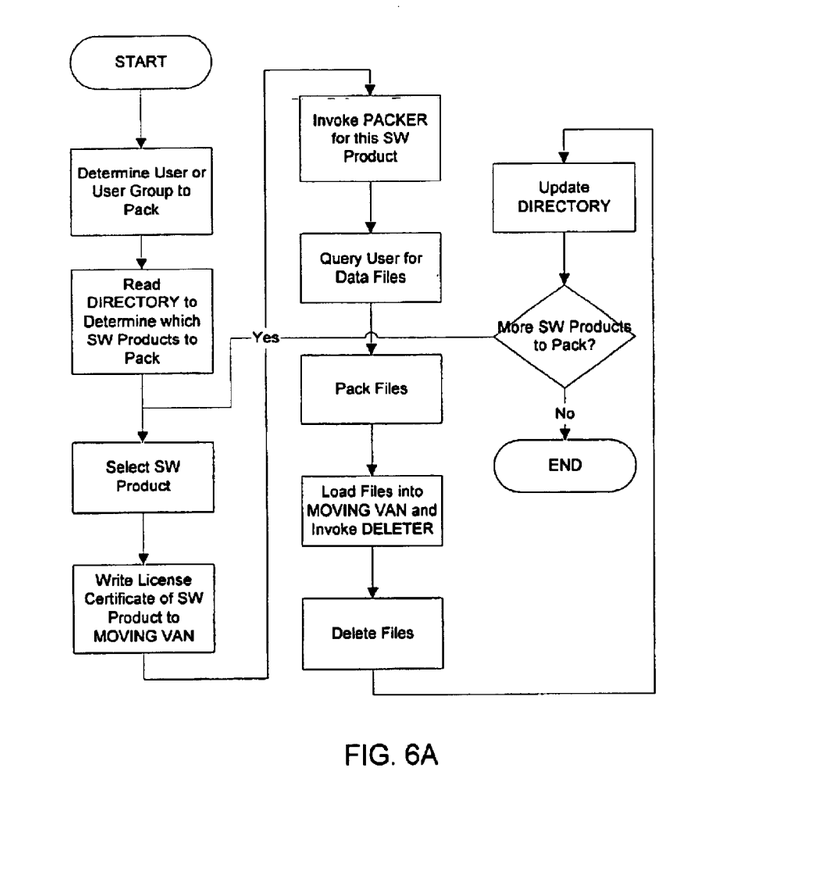
FIG. 6A is a flowchart of the packing and loading process.

When a user decides that she wants to move from her current computer to a new computer, she invokes the LOADER 32, which is, in the preferred embodiment (FIG. 6), a facility of the operating system. The LOADER 32 can be invoked as a command, a menu option, a separate program, a screen icon, or the like. Interacting as necessary with the user, the LOADER 32 (FIG. 6A) performs the following operations:

(1) If the system supports multiple users or groups of users, the LOADER 32 determines which user or user group wishes to move (possibly by asking the user to identify himself, optionally requiring appropriate authentication by password or other means), and what software products are used by that user (hereinafter, "user" implies "or user group").

(2) Read the DIRECTORY 22 to determine which software products are to be migrated.

(3) For each software product:

(a) Optionally, determine the applicable licensing conditions, if any. Hereinafter, the term "license certificate" means and includes all of the applicable licensing conditions, if any, of a software product whether it is determined by various facilities of the present invention, incorporated into a certificate obtained from a license manager, or both. If appropriate, write the license certificate to the MOVING VAN 26 and, possibly, remove it from the current computer. If appropriate, write a flag or other indication in the MOVING VAN 26 that a new license must be obtained when the software product is installed on the new computer.

(a1) Optionally, the LOADER or PACKER recognizes the licensing specifications pertaining to each software product and, if required, disables the software product on the original computer. The software product can be disabled in a variety of ways (for example, by uninstalling it; by erasing one or more executable files; by setting an appropriate flag or switch in the OSPD to 'disabled' or the equivalent; by erasing a license certificate file; or by setting an appropriate flag or switch in a license certificate file to 'disabled' or the equivalent). Such disablement can occur when the product is packed and loaded, or, if the license permits it, when it has been verified that the software product has been successfully installed on the new computer.

(b) Invoke the PACKER 28 for that product, specifying if necessary the location and identity of the MOVING VAN 26, as well as the location and identity of any associated control file. The PACKER 28 can optionally query the user as to whether to pack the program files belonging to this particular product, the applicable data files, or both. For example, the user may know that she has a more recent version of the product on the new computer and thus may wish to move only the user data files, or may not want to move the existing software product for other reasons. The PACKER 28 for a particular program performs whatever operations may be necessary to prepare the files needed to be migrated. For example, it may create compressed versions of the current executable files for use by a standard installation program on the new computer system. Or, it may create files containing data extracted from other files, such as the WINDOWS registry. Optionally, each file in the list of files provided by the PACKER 28 to the LOADER 32 can be flagged or marked with one or more indicators, for example indicating actions that should be taken on the new computer. Optionally, the PACKER 28 flags or marks the software product or each file associated with the software product with one or more indicators as to actions that should be taken on the current computer pertaining to the software product as a whole or each individual file: do not delete; delete after being placed in the MOVING VAN 26; delete after move is complete; delete after user verifies successful move; delete at user option; delete when the provisions of the software product license require it to be deleted from the current computer.

In the preferred embodiment, this flagging or marking is done in the OSPD [in WINDOWS, the Registry] itself. Some of these operations can be performed or initiated by the PACKER 28 itself or the LOADER 32 during the current invocation, while some may not be possible to perform until a later time. Optionally, the LOADER 32 signals the PACKER 28 that it has completed the file transfer so that the PACKER 28 can invoke the DELETER 46 (FIG. 8) to delete all or some of the specified files, or to uninstall the software product from the current computer, if this is necessary.

(c) In many operating environments, a particular product or family of products is associated with one or more file types. (For example, the extension XLS normally identifies a MICROSOFT EXCEL spreadsheet.) Optionally, if the product is associated with one or more file types, the LOADER 32 offers to scan the existing computer's disk or disks for files of the type or types associated with the product and gives the user the option to include all or some of these files in the MOVING VAN 26. (This can be done using standard interfaces, such as a presentation in the format of WINDOWS EXPLORER.) The LOADER 32 can also offer the user the option to delete these files now or during the clean-up phase, with the same sorts of options for the program files themselves.

In a preferred embodiment, the invention includes a default list of file types and/or directories (folders) to exclude from this process (an "Exclusion List"), such as cache folders, temporary files, etc. Such a list should be modifiable by a user.

(d) Update the DIRECTORY as appropriate.

Figure 7:
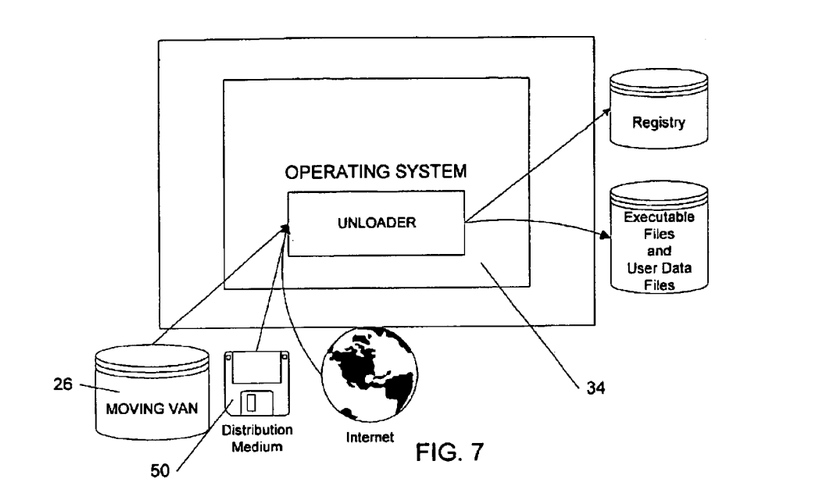
FIG. 7 is a diagram of the unpacking on the new computer.
Figure 7A:
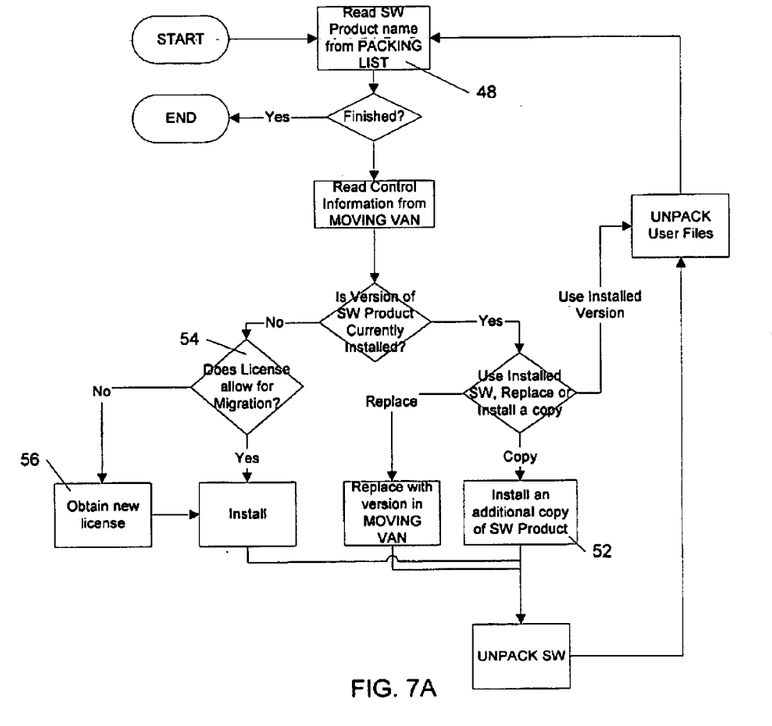
FIG. 7A is a flowchart of the unpacking process on the new computer.

(e) Add the name of the product to the PACKING LIST 48 (FIG. 7A).

(3) Optionally, present to the user a list of all files on the current computer that have not already been packed, providing a facility by which the user can conveniently select all or some of the files to pack. (This can be done using standard interfaces, such as a presentation in the format of WINDOWS EXPLORER.) In the preferred embodiment, the invention includes a user-modifiable Exclusion List.

(4) Close the MOVING VAN 26 and signal that packing is completed. Rather than placing the files in the MOVING VAN 26, the specified files can also be directly copied to another computer or to a storage device accessible by both the current computer and the new computer, for example, an Internet File Transfer Protocol (FTP) repository.

Optionally, the LOADER 32 creates and maintains a log of its activities.

(E) Unloading and Unpacking

On the new computer, the user invokes the UNLOADER 34. The UNLOADER opens the MOVING VAN 26 and reads the PACKING LIST 48 to determine what software products have been loaded.

In a preferred embodiment (FIGS. 7 and 7A), unless otherwise noted, the operations below are performed by the UNPACKER 30 for that software product. In an alternative embodiment, all or some of these operations can be performed by the UNLOADER 34 itself.

All of the operations described below are optional, such that not every operation is required during a migration. Also, the operations described below need not necessarily be performed in the exact order given here. For each software product, the UNLOADER 34 performs the following operations:

(1) Read control information from the MOVING VAN 26 to determine how the unpacking operation is to be performed, such as, for example: copy to the same location as on the current computer (default operation); copy to a new name and/or specified directory; pass the name of the file to the UNPACKER 30 without first copying; copy to a temporary file and pass the name of the temporary file to the UNPACKER 30.

(2) Determine whether a version of the software product is already installed on the new computer, and, if so, whether to leave it in place, replace it with the version from the MOVING VAN 26, or install the version from the MOVING VAN 26 without deleting the existing version, step 52 (FIG. 7A). This choice can be a user option or can be determined by a specification of the software product itself.

(3) Determine the versions and licensing terms and conditions of the software product, if it already exists on the new computer, and/or if a license certificate is in the MOVING VAN 26 to verify that migration will not violate any licensing agreement. Optionally, obtain if necessary the license from the MOVING VAN 26 or obtain a license from the original distribution medium or from the vendor or distributor via a network such as web site accessible via the Internet or by providing contact data such as a telephone number or email address as in steps 54, 56, (FIG. 7A).

(4) Optionally, verify with the user that the user actually wants to unpack this software product. (If not, the Unloader goes on to process the next software product on the PACKING LIST 48).

(5) If appropriate, invoke the UNPACKER 36 to install the software product from the MOVING VAN 26, from the original distribution medium, or via a network such as the Internet. If the MOVING VAN 26 contains an installation or setup program (for example, SETUP.EXE) for this software product, it offers the user the option to write the installation or setup program to a user-specified directory on the new computer. Optionally, the UNPACKER 30 also offers to execute the installation or setup program, which, through its own actions and with access to any additional files pertaining to this product that may exist in the MOVING VAN 26, subsequently installs the product on the new computer. If the UNPACKER determines that the MOVING VAN 26 contains executable files but does not contain an installation or setup program, it offers the user the options to write the executable programs to a default or to a user-specified directory on the new computer and to register the program with the operating system.

The UNPACKER 30 can be invoked by the UNLOADER 34 in different modes:

(a) Pre-file-move mode: The UNLOADER 34 invokes the UNPACKER 30 without unpacking any other files. In this case, the UNPACKER 30 itself reads files and other information as appropriate from the MOVING VAN 26 and performs the appropriate processing.

(b) Post-file-move mode: The UNLOADER 34 unpacks some or all of the files associated with the software product, performs the appropriate processing, and then invokes the UNPACKER 30 to complete the process.

(6) Optionally, check (via a network such as the Internet) whether an update to the software is available and, if so, obtain and apply the update.

(7) Optionally, unpack those executable files, control files, and user data files from the MOVING VAN 26 that have not already been unpacked.

(8) Optionally, selectively apply appropriate control information from the original computer to the new computer.

(9) Optionally, if the UNLOADER 34 has access (for example, via a network such as the Internet) to the original computer, the UNLOADER 34 can offer to delete those files that were marked for deletion during the packing and loading operation, with or without user interaction and confirmation.

The UNLOADER 34 (or the UNPACKER 30) can add or update annotations in the PACKING LIST 48. The UNLOADER 34 can optionally create and maintain a log of its activities.

In an alternative embodiment, some or all of the software products in the MOVING VAN 26 are not fully installed by the UNLOADER 34, and the activity log indicates to the user which installation or setup programs are to be executed by the user after the UNLOADER 34 has finished executing.

(E) Cleaning Up on the Current (Original) Computer

Figure 8:
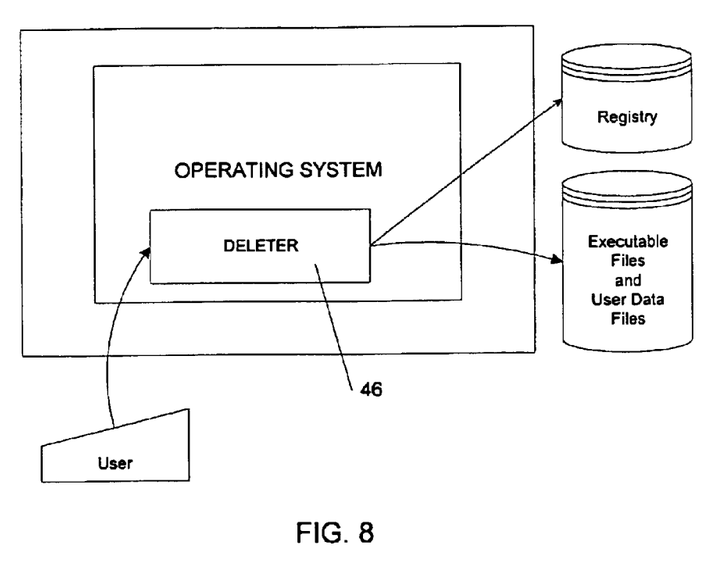
FIG. 8 is a diagram of the clean-up process on the original computer.

If it has not been done as part of the packing and loading or unloading and unpacking processes, the DELETER 46 is invoked on the original computer. There are a number of ways in which the DELETER 46 can be initiated. For example, it can be invoked directly by the user; the LOADER 32 can schedule it to run on the original computer at a particular time (for example, the next day) as part of the packing and loading process; the LOADER 32 can place it in a start-up list or start-up directory of the original computer; the UNLOADER 34 can send a message to the user on the original computer reminding him to initiate the DELETER 46; if the appropriate flags and annotations are incorporated into the OSPD (such as the WINDOWS Registry) itself, the operating system can invoke the DELETER whenever a software product that has been marked for delete is started. (Other, less desirable, methods of starting the DELETER will be apparent to those skilled in the art.

When the DELETER 46 is started, it consults the appropriate flags and annotations for the software product or software products subject to deletion and performs as indicated, possibly interacting with the user as appropriate (FIG. 8).

There is flexibility as to the order in which some of these operations are performed. For example, the name of the product can be placed in the PACKING LIST 48 before rather than after the files associated with the product are placed in the MOVING VAN 26.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for migrating a user's software programs from a first to a second computer, the method comprising the steps of:

identifying on the first computer, software products having software product files and product data files requiring to be prepared for future migration;

packing the software product files and the product data files in a manner that enables them to be moved at a future point in time to the second computer, based on the identifying step previously executed;

operating the first computer in accordance with a general purpose thereof including by running the software product files or generating associated user files after the packing in the first computer;

further including storing data files changes and/or control information changes generated by running the software products on the first computer and additionally packing the changes for use on the second computer;

moving the previously packed software product files and the product data files without using cloning to the second computer, except for files that are manually excluded, said moving of files being carried out without resorting to examining or considering all files of said first computer including those that are not associated with said identified software products being prepared for future migration; and unpacking the moved software product files and the product data files onto the second computer.

2. The method of claim 1, in which the identifying and packing steps are carried out by automated software programs and including providing at least a portion of said automated software programs as part of an operating system of the first computer.

3. The method of claim 2, including allowing a user to manually edit a packing list of said product files and product data files generated automatically by said automated software programs.

4. The method of claim 1, in which the unpacking step is carried out by an automated unpacking software program and at least a portion of the automated unpacking software program is formed as part of an operating system of the second computer.

5. The method of claim 1, including carrying out said identifying step during installation of said software product files and said product data files on the first computer.

6. The method of claim 1, further including identifying control information associated with said software products during said installation.

7. The method of claim 1, further including tracking data files or control information generated by running the software products on the first computer and additionally packing tracked data.

8. The method of claim 1, wherein said packing step includes packing files by compressing or encrypting said files.

9. The method of claim 1, wherein said packing step includes copying said software products onto removable storage medium loadable onto said first computer.

10. The method of claim 1, wherein said moving step comprises transferring said software product files and product data files to the second computer via a data communication network.

11. The method of claim 10, wherein said data communication network is the Internet.

12. The method of claim 1, wherein said software products are operable under specified licensing terms and conditions, and including, controlling packing of said software products based on said specified licensing terms and conditions.

13. The method of claim 12, including disabling the operation of said software products on the first computer.

14. The method of claim 12, including communicating with an independently provided software license manager and receiving from said software license manager said licensing terms and conditions.

15. The method of claim 1, including deleting said software products from said first computer at the time of carrying out said moving step.

16. The method of claim 1, including providing one or more software products to be moved with a packer program that passes a list of executable files or control information and with an unpacker program which is operable for unpacking the executable files or control information at the second computer.

17. The method of claim 16, in which said packer and unpacker programs are comprised of a plurality of software files identified by unique, standardized software file names.

18. The method of claim 16, further including providing a loader program and an unloader program for controlling said packer and unpacker programs.

19. The method of claim 18, including utilizing the unloader program to handle user data files.

20. The method of claim 1, further including surveying software products installed on the first computer and including further carrying out said identifying step based on results of said surveying step.

21. The method of claim 1, further including monitoring the execution of the software products installed on the first computer and including carrying out said identifying step based on results of said monitoring step.

22. The method of claim 1, including storing information defining the characteristics of the software products and data files in a registry and including operating a registry reader to read the registry to determine what software products are installed.

23. The method of claim 1, in which the step of moving the data comprises designating a moving van and constructing the moving van as a collection of data pertaining to the software products to be moved.

24. The method of claim 23, further comprising including with the moving van a packing list.

25. The method of claim 24, the packing list including at least one license certificate for the second computer.

26. The method of claim 1, including refraining from unpacking onto the second computer the contents of a given software product, when that given software product is already available at the second computer from another source.

27. The method of claim 26, in which the given software products is available at the second computer by having been previously loaded thereon.

28. The method of claim 26, in which the given software product is available at the second computer by being loadable from a third computer.

29. The method of claim 26, in which the given software product is available at the second computer by being loadable from distribution media.

30. The method of claim 26, in which the given software product is available at the second computer by being loadable from the Internet.

31. The method of claim 1, including enabling said moving step only upon simultaneous execution disablement of said software products on the first computer.

32. A system for migrating a user's software operating environment from a first to a second computer, the system comprising:

said first computer;

identifying software that serves to automatically identify those software products which define the operating environment, said software products having software product files and product data files requiring to be prepared for future migration, said identifying software being selectively operable during installation of said software product files and said product data files on the first computer;

packing software that packs the software product files and the product data files to be moved based on the identifying step previously executed;

operating the first computer in accordance with a general purpose thereof including by running the software product files or generating associated user files after the packing in the first computer;

further including storing data files changes and/or control information changes generated by running the software products on the first computer and additionally packing the changes for use on the second computer;

moving software that moves the software product files and the product data files without using cloning to the second computer and after the software product files and the product data files have been operationally utilized in the first computer, said moving of files being carried out without resorting to examining or considering all files of said first computer including files that are not associated with said identified software products being prepared for future migration, except for files that are manually excluded; and unpacking software that unpacks the moved software product files and product data files onto the second computer.

33. The system of claim 32, in which the packing software comprises a packer program and a loader program and the loader program is a constituent component of an operating system of the first computer.

34. The system of claim 32, in which the unpacking software comprises an unpacker program and an unloader program and the unloader program is a constituent component of an operating system of the second computer.

35. The system of claim 32, including a tracking program that tracks data files or control information generated by running the software products on the first computer and additionally packing tracked data.

36. The system of claim 32, including a compressing program that compresses or encrypts said files.

37. The system of claim 32, wherein said software products are operable under specified licensing terms and conditions, and said packing software controlling the packing of said software products based on said specified licensing terms and conditions.

38. The system of claim 37, further including an independently provided software license manager and the packing software being configured to communicate with the license manager to receive therefrom said specified licensing terms and conditions.

39. The system of claim 32, in which the packing software disables the operation of said software products on said first computer when packing the files to be moved to the second computer.

40. A computer-readable medium comprising a software product with a facility for migrating the operation and functionality of the software product from a first to a second computer, the software product comprising:

software product files which define the operation and functionality of the software product;

packing software resident with the software product files on the medium and operable and including identifying information for identifying the software product files requiring to be transferred to the second computer in a future migration, and for enabling retrieving said software product files at a future point in time; the software product files and product data files being operationally utilized in the first computer after the packing software packs the software product files and the product data files, further including storing data files changes and/or control information changes generated by running the software product on the first computer and additionally packing the changes for use on the second computer, without resorting to examining or considering all files of said first computer including files that are not associated with said identified software product being prepared for future migration; and interface software for interfacing the packing software with other software that is instrumental in facilitating the migration of the software product to the second computer without using cloning.

41. The computer-readable medium comprising a software product of claim 40, in which the software product also includes unpacking software that functions to unpack the moved software product files onto the second computer.

42. The computer-readable medium comprising a software product of claim 40, in which the packing software includes a packer program and a loader program for respectively identifying files to be moved and for controlling the migration of said software product files.

43. The computer-readable medium comprising a software product of claim 42, in which the software product files comprise software product control files and software product data files.

44. A method for migrating the operation and functionality of a software product from a first to a second computer, the method comprising the steps of:

identifying on the first computer, software product files and product data files of said software product requiring to be prepared for future migration;

packing the software product files and product data files to be moved based on the identifying step previously executed;

operating the first computer in accordance with a general purpose thereof including by running the software product files or generating associated user files after the packing in the first computer;

further including storing data files changes and/or control information changes generated by running the software product on the first computer and additionally packing the changes for use on the second computer;

moving the software product files and the product data files to the second computer without using cloning and after the software product files and the product data files have been operationally utilized in the first computer, except for files that are manually excluded, said moving of files being carried out without resorting to examining or considering all files of said first computer including files that are not associated with said identified software product being prepared for future migration; and unpacking the moved software product files and the product data files onto the second computer.

45. The method of claim 44, including carrying out the identifying, packing, moving and unpacking steps for a plurality of software products.

46. The method of claim 45, including carrying out said steps of identifying, packing, moving, and unpacking for a sufficient number of software products installed at the first computer such as to reproduce the software operating environment of the first computer at the second computer.

47. The method of claim 46, including carrying out said steps of identifying, packing, moving and unpacking relative to all of the software products installed at the first computer.

48. A computer-readable medium comprising a software facility for migrating the operation and functionality of a software product from a first to a second computer, the facility and software product comprising:

software product files which define the operation and functionality of the software product;

software data files which contain data associated with or resulting from the operation and functionality of the software product;

packing software operable for identifying software data files and control information requiring to be transferred to the second computer in a future migration regardless of and without restriction to said software product files and said software data files being operationally utilized in the first computer after the packing software packs the software product files, the software data files, and the control information, further including storing data files changes and/or control information changes generated by running the software product on the first computer and additionally packing the changes for use on the second computer; and interface software for interfacing the packing software with other software that is instrumental in facilitating the replication of the software product on the second computer without using cloning and without resorting to examining or considering all files of the first computer including files not associated with said software product.

49. The software facility of claim 48, further including unpacking software that functions to unpack files to be transferred onto the second computer.

50. The software facility of claim 48, in which the packing software includes a packer program and a loader program for respectively identifying files to be moved and for controlling the migration of said software data and control files.

51. The software facility of claim 48, wherein the packing software is also operable for identifying software product files to be transferred.

* * * * *